E. J. BRANDT.
DESIGNATOR, RECORDER, AND REGISTER.
APPLICATION FILED MAY 6, 1905. RENEWED JAN. 29, 1908.
984,999.
Patented Feb. 21, 1911.
5 SHEETS—SHEET 1.
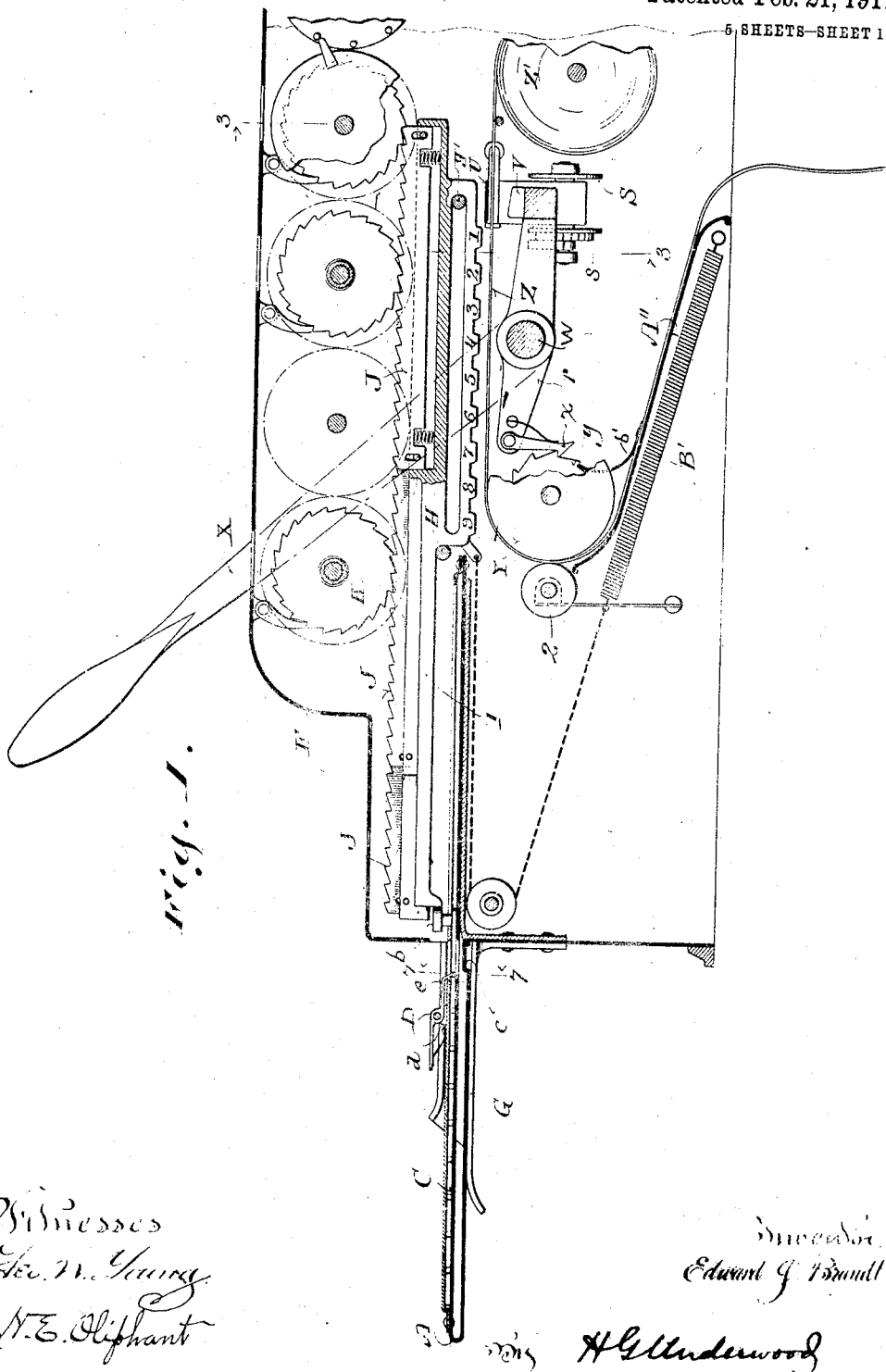

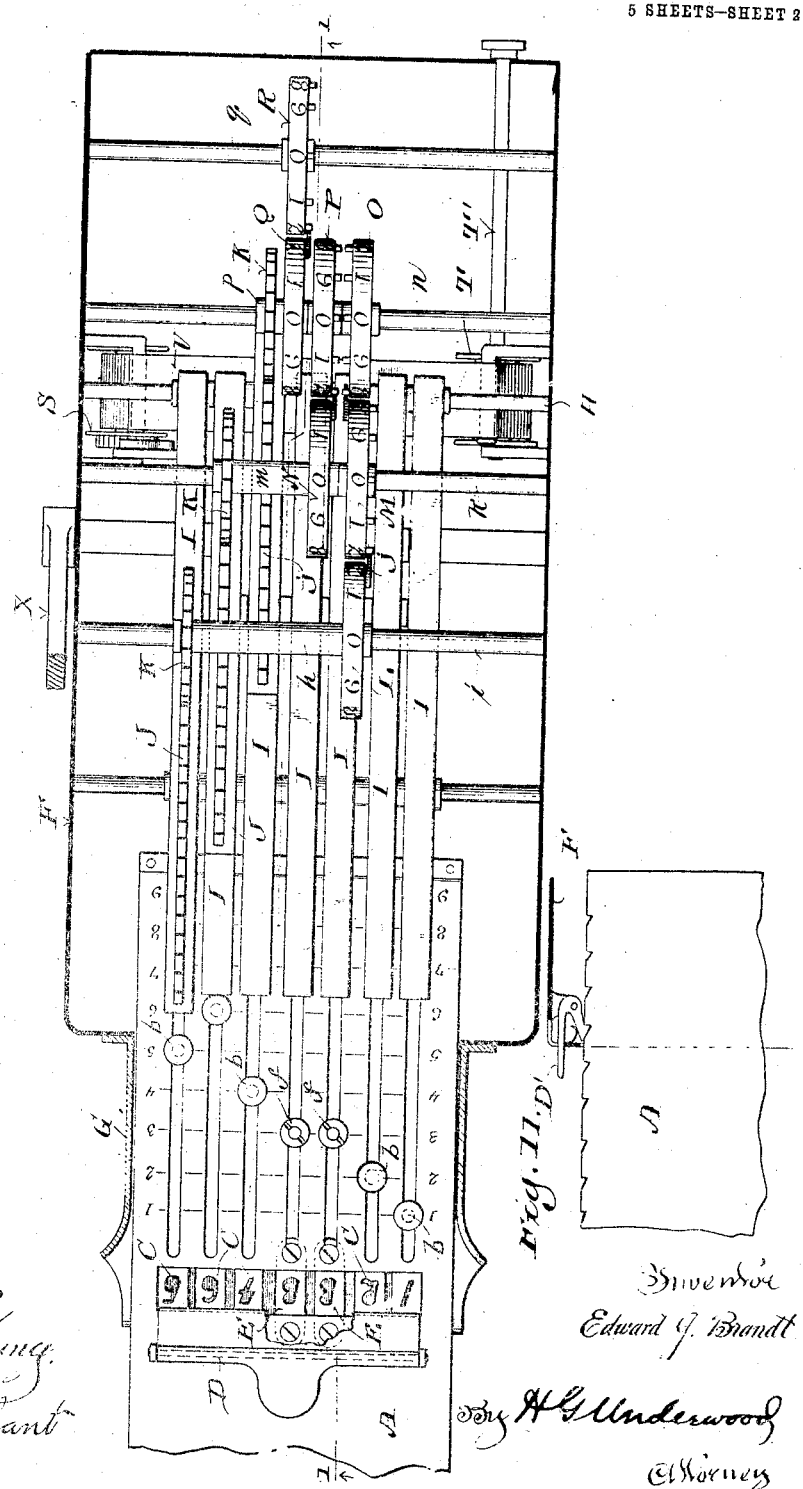

E. J. BRANDT.
DESIGNATOR, RECORDER, AND REGISTER.
APPLICATION FILED MAY 6, 1905. RENEWED JAN. 29, 1908.
984,999.
Patented Feb. 21, 1911.
5 SHEETS—SHEET 3.
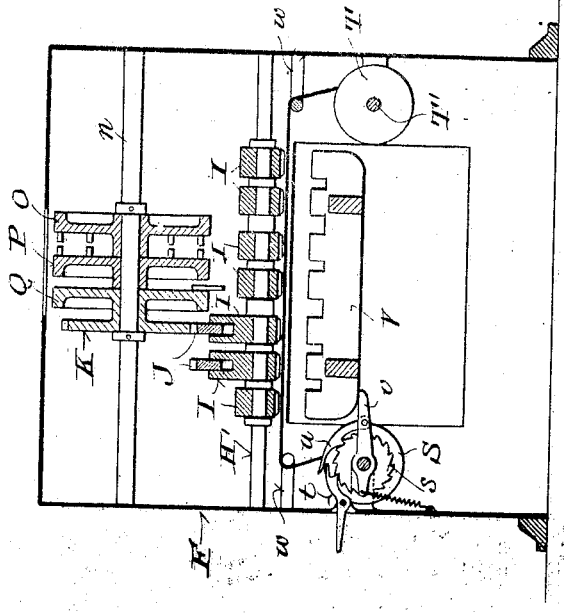
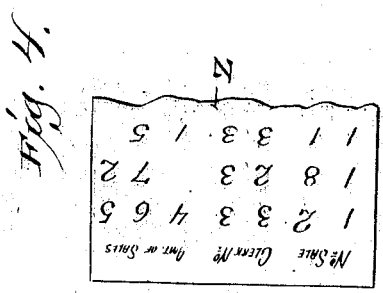

E. J. BRANDT.
DESIGNATOR, RECORDER, AND REGISTER.
APPLICATION FILED MAY 6, 1905. RENEWED JAN. 29, 1908.
984,999.
Patented Feb. 21, 1911.
5 SHEETS—SHEET 4.
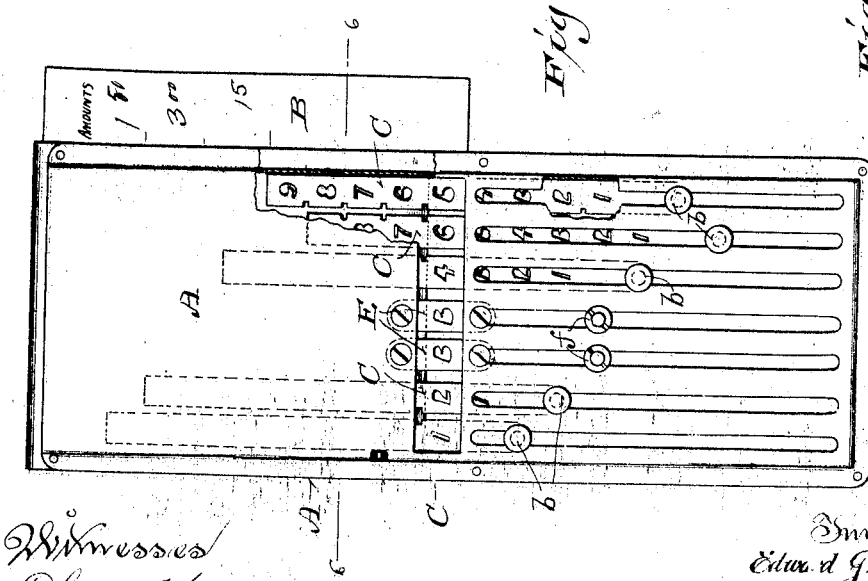
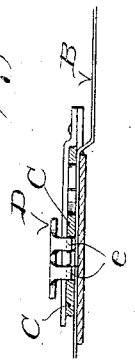

E. J. BRANDT.
DESIGNATOR, RECORDER, AND REGISTER.
APPLICATION FILED MAY 6, 1905. RENEWED JAN. 29, 1908.
984,999.
Patented Feb. 21, 1911.
5 SHEETS—SHEET 5.
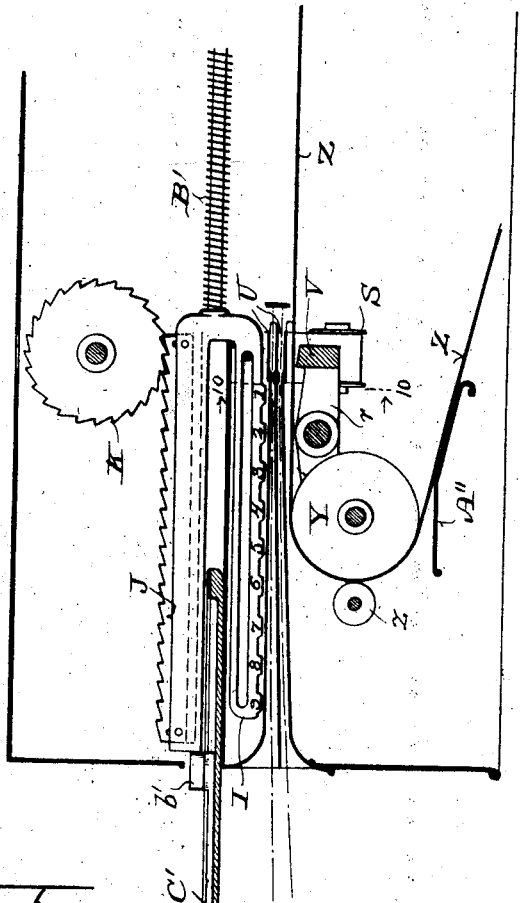
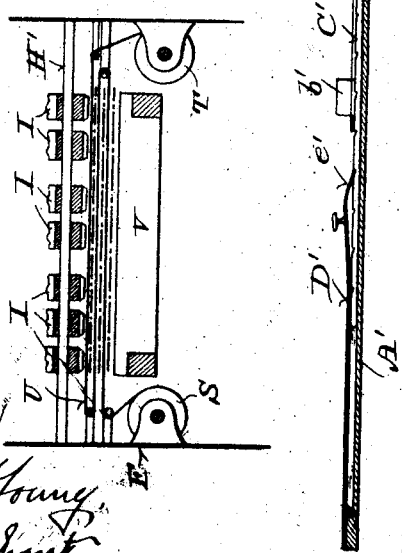

UNITED STATES PATENT OFFICE.

EDWARD J. BRANDT, OF WATERTOWN, WISCONSIN, ASSIGNOR TO BRANDT CASHIER COMPANY, OF CHICAGO, ILLINOIS, A CORPORATION OF ILLINOIS.

DESIGNATOR, RECORDER, AND REGISTER.

984,999.　　　　Specification of Letters Patent.　　Patented Feb. 21, 1911.

Application filed May 6, 1905, Serial No. 259,130. Renewed January 29, 1908. Serial No. 413,268.

*To all whom it may concern:*

Be it known that I, EDWARD J. BRANDT, a citizen of the United States, and resident of Watertown, in the county of Jefferson and State of Wisconsin, have invented certain new and useful Improvements in Designators, Recorders, and Registers; and I do hereby declare that the following is a full, clear, and exact description thereof.

The main object of the invention is to provide for recording sales in a mercantile establishment, by number, seller and money-value, as well as to provide for automatic registration of the sum total money value of successively recorded sales, said invention consisting in what is hereinafter particularly set forth with reference to the accompanying drawings and subsequently claimed as pertaining to a detachable implement, having adjustable parts by which to indicate predetermined arbitrary designations and means in conjunction with the implement that is also termed a designator, to record the indicated designations, or to register sum total money value of a succession of cash transactions or both.

Figure 1 of the drawings represents a vertical longitudinal section view of a designator and combined recording and registering machine in accordance with my invention, said view being indicated by lines 1—1 in the next figure; Fig. 2, a plan view of the designator and machine, the actuating lever of said machine being in horizontal section; Fig. 3, a vertical transverse section view of said designator and machine, the same being indicated by lines 3—3 in Fig. 1; Fig. 4, a plan view of a fragment of a record-slip; Fig. 5, a plan view of a designator partly broken away; Fig. 6, a sectional view on the plane indicated by line 6—6 in Fig. 5; Fig. 7, a similar view indicated by line 7—7 in Fig. 1; Fig. 8, a plan view of a sales-ticket; Fig. 9, a vertical longitudinal section view of another form of designator and fragment of another form of recording-and-registering machine, Fig. 10, a sectional view on line 10—10 in Fig. 9, and Fig. 11, a detail view illustrating means for locking the designator in the machine.

Referring by letter to the drawings, A indicates a frame provided with a pocket in which to slide a sales-ticket B, and adjustable in the frame lengthwise of the same are slides C each provided with an upper lug or knob $b$ that is guided in a slot in the top of said frame. As shown in Figs. 1 and 2, each slide C may be a stencil of numerical characters 1 to 9, in serial order at regular intervals longitudinally of said slide, and the cutting of the stencil is such as to facilitate the use of a pencil for tracing the outlines of said characters on a sales-ticket in the pocket aforesaid, the lower end of said pocket being elevated, as shown at $c$ in Figs. 1 and 7. The top of the pocket is provided with a lower transverse aperture through which the stencil-cuts in the slides are accessible. Each slide is provided with notches, and a spring-controlled bar D journaled in bearings $d$ on the frame aforesaid is provided with latch-tongues $e$ that engage with registering notches to hold the slides in adjusted position. Stencil plates E are shown fixed in the frame aforesaid under the transverse top-aperture of same, and lugs or knobs $f$, corresponding to the plates, are adjustable in longitudinal top slots of said frame. The cuts in the plates E are numerical characters and similar to those in the slides C in so far as pertains to facilitating the use of a pencil to outline said characters on a sales-ticket in the adjacent pocket. However slides similar to the ones C provided with upper lugs or knobs may be substituted for the stencil plates and suitable means employed to lock said slides in adjusted position.

The construction and arrangement of parts thus far described constitutes a detachable implement or designator of the form illustrated in Figs. 1, 2, 5, 6 and 7. Another form of designator illustrated in Fig. 9, comprises a frame A', slides C' adjustable longitudinally of the frame, a spring-plate D' having tongues $e'$ engageable with ratchet-notches transversely of said slides to hold the same and lugs or knobs $b'$ therewith in adjusted position. Knobs similar to the ones $f$ may be employed in fixed adjustment on the last described form of designator.

Referring again to the first described form of designator, a sales-ticket B inserted in the pocket of said designator is sufficiently wide to leave exposed the money item or items thereon, and adjustment of one or more slides at the right of the aforesaid designator is had to bring a stencil-character in each in register with the transverse top aperture of the designator-frame, and the character or characters thus positioned indicate the total of money value on said ticket, as for instance four dollars and sixty-five cents is indicated by an adjustment of said slides to aline the characters 4 6 5 in view through said aperture. An adjustment of one or both of the slides C at the left of the designator is also had to bring a stencil character in each in register with the aperture aforesaid, said character or characters corresponding to the number of a sale, for instance twelve indicated by the characters 1 2. The characters in the stencil-plates E indicate the number of the seller, 33 for instance. By means of a pencil, guided in the several stencil characters accessible through the transverse top aperture of the designator, the number of the sale, the number of the seller and the money value of the item or items of sale are footed on the sales-ticket. The upwardly projecting lug or knob $b$ of each adjusted slide is now distant from normal position as many spaces as corresponds to the stencil-character of said slide displayed through the top aperture of the designator; and said designator is preferably provided with a numerical index for said characters and spaces, as is herein shown. The lugs or knobs $f$ having been properly positioned, the designator with the sales-ticket is now ready to be fed to a recording machine, that is preferably combined with an automatic register, one form of such a machine being illustrated by Figs. 1, 2 and 3. The machine aforesaid is shown as consisting of a casing F provided at one end with a guide support G for the designator. Guided in the casing between collars on rods H, H', are longitudinally slotted spring-controlled bars I each in the path of a lug or knob projection $b$ or $f$ of the designator. The bars are recessed at regular intervals to provide underside projections 1 to 9 inclusive, said projections being type for arbitrary values expressed in words or numerals from one to nine inclusive in ascending order. The slots of the bars are engaged by the rod H', and the play of said bars is limited by said rod. The upper sides of certain of the type-bars corresponding to the companion slides designator are provided with grooves in which spring-controlled racks J are vertically reciprocative, and these racks mesh with ratchet-wheels K of a multiple register-mechanism. The units ratchet-wheel and the units register-wheel L are herein shown connected, by a sleeve $h$ loose on an arbor $i$, and a tappet $j$ of said register-wheel operates in conjunction with equi-distant lateral studs of a tens register-wheel M loose on another arbor $k$ that also serves as a bearing for another tens register-wheel N connected, by a sleeve $m$, with the tens ratchet-wheel.

Each tens register-wheel is provided with a tappet that operates in conjunction with equi-distant lateral studs of a hundreds register-wheel of which there are three loose on an arbor $n$, the ones O, P, being independent of each other and the one Q, but the latter is connected, by a sleeve $p$, with the hundreds ratchet-wheel and provided with a tappet operative in conjunction with equi-distant studs of a thousands register-wheel R that is loose on an arbor $q$, all of the register-mechanism being clearly illustrated in Fig. 2. At each revolution of the units-wheel L, the tens-wheel M is moved one space, and at each revolution of said tens-wheel the hundreds-wheel O is moved one space. At each revolution of the tens-wheel N, the hundreds wheel P is moved one space. At each revolution of the hundreds-wheel Q the thousands wheel R is moved one space.

Arranged on spools S, T, in the casing F is an ink-ribbon U over a hammer-bar V provided with arms $r$ fast on a rock-shaft W to which a lever X is made fast outside of said casing. The ribbon-spool S is provided with a ratchet-wheel $s$ engaged by a detent $t$ and a pawl $u$, the pawl being in pivoted connection with the spring-controlled lever $v$ in the downward path of the hammer bar V, and by means of said pawl-and-ratchet mechanism, the ink-ribbon is intermittently wound from the spool T onto the spool S aforesaid. Guides $w$ are provided for the ribbon and the spool T is fast on a spindle T' that projects through one end of the casing F to be turned by hand to wind said ribbon back onto said spool. A spring-controlled pawl $x$ in pivotal connection with one of the arms $r$ of the hammer-bar engages a ratchet-wheel $y$ of a roller Y over which a continuous strip of paper Z is traveled from a roll Z' of same, and a spring-controlled roller $z$ is arranged to tension the paper. The paper-feed is intermittent and controlled by the operation of the hammer-bar V, said paper being fed between said bar and ink-ribbon. A spring-detent $b'$ engages the ratchet-wheel $y$ of the paper-supporting roller Y to prevent reverse motion of said roller, and the free portion of said paper is supported on a shield A'' shown in Fig. 1 over the springs B' that control the type-bars aforesaid in that organization of the machine.

When the designator is pushed by hand into the machine, the adjusted upwardly projecting devices of said designator cause a forward movement of type-bars to bring designations on the same, corresponding to those indicated by the aforesaid designator, over the ink-ribbon and paper, and by operating the lever X, a record of said designations is had on said paper. For instance the sale number 12, the seller's number 33 and the sum total money value 465 standing for four dollars and sixty-five cents is printed on the record strip. At the same time the racks with certain of the type-bars operate the corresponding ratchet-wheels to effect a registration of said amount. Reversal of the lever results in feed of the record-strip and ink-ribbon, and on withdrawal of the designator from the machine, the type-bars are automatically returned to normal position. The latch-plate of the designator being lifted a proper inclination of said designator will result in gravity return of all the previously adjusted slides to normal position.

As shown in Fig. 11, the designator may be provided with ratchet-notches for the engagement of a spring-controlled detent D' in the recording and registering machine to prevent automatic retraction of said designator should the same be freed by the operator, it being necessary to release the detent to permit a withdrawal of the aforesaid designator from said machine.

In Figs. 9 and 10, the ink-ribbon is shown traveled in parallel stretches overlying the record-strip and duplicate sale-tickets, these tickets being indicated by dotted lines in feed-compartments of the machine. Hence when the type-bars of the machine are properly adjusted, by means of the designator, and the lever of the machine operated to cause an impact of the hammer-bar, the designations indicated by said designator are printed on said ticket and record-strip. The duplicate sale-tickets are sent with the designator shown in Fig. 9, to the recording-and-resistering machine and separately fed to the same. In matters of detail, the recording-and-registering machine illustrated by Figs. 9 and 10 is somewhat different from the one shown by Figs. 1, 2 and 3, but the general construction and operation of both machines is practically the same, and it is within the scope of my invention to provide for stenciling or embossing instead of printing the record. It is also obvious that the recording-and-registering machine may be varied in construction from what is herein shown without departure from said invention in the broad interpretation of the same, and it is also to be understood, that either a recording machine or a registering machine may be substituted for the combined recording-and-registering machine according to the demands of the trade.

A showing analogous to that above specified and hereinafter claimed is made in my now pending applications Serial No. 307,787, and Serial No. 307,788, both filed March 24, 1906, the first of which applications is to a calculating implement of the same genus as the detachable implement herein set forth, and the second of said applications contains a disclosure of subject-matter similar to that disclosed herein, but involving specific details of construction not previously shown or described.

Having thus described my invention what I claim as new, and desire to secure by Letters-Patent is:—

1. A detachable implement comprising devices arranged for step-by-step adjustment to indicate arbitrary designations, means for locking these devices in adjusted position, a machine having corresponding indicating devices each arranged to be adjusted by a device of the implement held out of normal position during the time of a pushing engagement of said implement with the machine, and means within the machine for obtaining a permanent record from its adjusted indicating devices.

2. A detachable implement comprising devices for step-by-step adjustment to indicate arbitrary designations, means for locking these devices in adjusted position, and register-mechanism operative in conjunction with the implement as a result of a pushing contact of the devices aforesaid with movable parts of said mechanism, there being an adjustment of said devices out of normal position.

3. A detachable implement comprising devices arranged for step-by-step adjustment to indicate arbitrary designations, means for locking these devices in adjusted position, a machine having corresponding indicating devices each arranged to be adjusted by a device of the implement held out of normal position during the time of a pushing engagement of said implement with the machine, means within the machine for obtaining a permanent record from its adjusted indicating devices, and mechanism also within the machine coöperative with the adjustable indicating devices thereof for registering the sum total money value of successive records.

4. A detachable implement comprising devices arranged for step-by-step adjustment to arbitrarily indicate sales by number, seller and money value; a machine having corresponding indicating devices each arranged to be adjusted by a device of the implement held out of normal position during the time of a pushing engagement of said implement with the machine, and means within the machine for obtaining a permanent record from its adjusted indicating devices.

5. A detachable implement comprising devices arranged for step-by-step adjustment to arbitrarily indicate sales by number, seller and money value; a machine having corresponding indicating devices each arranged to be adjusted by a device of the implement held out of normal position during the time of a pushing engagement of said implement with the machine, means within the machine for obtaining a permanent record from its adjusted indicating devices, and mechanism also within the machine coöperative with the adjustable indicating devices thereof for registering the sum total money value of successive records.

6. A detachable implement comprising devices arranged for step-by-step adjustment to indicate arbitrary designations, and means for locking these devices in adjusted position; in combination with a machine comprising movable devices each adjustable by one of those of the implement aforesaid out of normal position incidental to a pushing insertion of the implement in the machine, said devices of said machine being provided with characters corresponding to the designations indicated by the companion devices of said implement, means by which to obtain a permanent record of a predetermined arbitrary designation or designations from an adjusted character-device or devices on material opposed to same, and means for automatic retraction of the character device or devices on withdrawal of the aforesaid implement from the machine.

7. A detachable implement comprising devices arranged for step-by-step adjustment to indicate arbitrary designations, and means for locking these devices in adjusted position; in combination with a machine comprising type-devices each adjustable by one of the devices aforesaid out of normal position incidental to pushing insertion of the implement in the machine, the type being correspondent to the designations capable of being indicated by the companion device of said implement, an ink-ribbon opposed to a type-device or devices out of normal position, an impact device opposing the ribbon, means for actuating the impact-device and for automatic intermittent feed of the ribbon, and means for automatic retraction of the adjusted type-devices on withdrawal of the aforesaid implement from the machine.

8. A detachable implement comprising devices arranged for step-by-step adjustment to indicate arbitrary designations, and means for locking these devices in adjusted position; in combination with a machine comprising type-devices each adjustable by one of the devices aforesaid out of normal position incidental to pushing insertion of the implement in the machine, the type being correspondent to designations capable of being indicated by the companion device of said implement, means for printing from an adjusted type-device or devices, and means for automatic retraction of the adjusted type-device or devices on withdrawal of the aforesaid implement from the machine.

9. A detachable implement comprising devices arranged for step-by-step adjustment to indicate arbitrary designations, and means for locking these devices in adjusted position; in combination with a machine comprising type-devices each adjustable by one of the devices aforesaid out of normal position incidental to pushing insertion of the implement in the machine, the type being correspondent to the designations capable of being indicated by the companion device of said implement, an ink-ribbon opposed to a type-device or devices out of normal position, an impact device opposing the ink-ribbon, means for actuating the impact device, a ribbon feed mechanism and a paper-feed mechanism coöperative with said impact device, and means for automatic retraction of the adjusted type-devices on withdrawal of the aforesaid implement from the machine.

10. A detachable implement comprising devices arranged for step-by-step adjustment to indicate arbitrary designations of money value, and means for locking these devices in adjusted position; in combination with a machine comprising register mechanism operative in conjunction with the implement as a result of pushing contact of one or more of said devices of the same out of normal position.

11. A detachable implement comprising devices arranged for step-by-step adjustment to indicate arbitrary designations of money value, and means for locking these devices in adjusted position; in combination with a machine comprising register mechanism operative in conjunction with the implement as a result of pushing contact of one or more of said devices of the same out of normal position, and a latch with which the aforesaid implement has step-by-step engagement in the course of its feed.

12. A detachable implement comprising devices arranged for step-by-step adjustment to indicate arbitrary designations, and means for locking these devices in adjusted position; in combination with a machine comprising recording devices in movable series each of which series is adjustable by one of the devices aforesaid out of normal position incidental to pushing insertion of the implement in the machine, said recording devices being characters corresponding to designations indicant by said devices of the implement, means for actuating alined recording devices in said machine, means for automatic registration of sum total money value of successive records, and means for automatic retraction of series of recording devices on withdrawal of the aforesaid implement from the aforesaid machine.

13. A detachable implement comprising adjustable devices for indicating arbitrary designations, in combination with a machine comprising sliding type-bars each adjustable by one of the devices aforesaid out of normal position incidental to pushing insertion of the implement in the machine, there being correspondence of the type of each bar with designations indicant by the companion device of said implement, yielding rack-bars carried by certain of the type-bars, means for printing from an adjusted type-bar or bars, a register-mechanism having ratchet-wheels engaging said rack-bars, and means for automatic retraction of the adjusted type-bar or bars on withdrawal of the aforesaid implement from the machine.

14. A detachable implement comprising adjustable devices for indicating designations of money value, in combination with a machine comprising recording mechanism actuated by an adjusted device or devices of the implement incidental to pushing insertion of said implement in the machine, and a latch with which the aforesaid implement has step-by-step engagement in the course of its feed.

15. A detachable implement comprising adjustable devices for indicating designations of money value in combination with a machine comprising recording and registering mechanism actuated by an adjusted device or devices of the implement incidental to pushing insertion of said implement in the machine, and a latch with which the aforesaid implement has step-by-step engagement in the course of its feed.

16. In a machine of the character described, the combination with accounting mechanism, of an entry device detachable from the machine and having elements secured therein differentially adjustable longitudinally for controlling said accounting mechanism, and means for securing said elements in adjusted position.

17. In a machine of the character described, the combination with an accounting mechanism, of an entry device detachable from the machine and having elements secured therein differentially adjustable longitudinally for controlling the accounting mechanism, and means for locking said elements against retrograde movement when the device is detached.

18. A machine comprising a series of recording devices of denominations in ascending order from naught to nine inclusive, said devices being settable in alinement, means for impacting all alined recording devices, and a detachable implement comprising differentially adjustable slides by which to determine adjustment of the recording devices aforesaid when engaged in said machine.

19. In an accounting mechanism comprising a self-contained entry device normally detached from the machine but adapted to be inserted therein, the entry device comprising a plurality of denominational differentially adjustable longitudinally movable elements with means for locking said elements against retrograde movement in any one of a plurality of positions.

20. In an accounting machine, the combination with an accounting mechanism, of an entry device detachable from the machine adapted to be inserted therein, said device comprising a plurality of slides secured in the device and means for retaining the slides in different positions of adjustment.

21. In a machine of the character described, the combination with accounting mechanism, of an entry device detachable from the machine and having adjustable longitudinally movable slide elements secured in the device for controlling said accounting mechanism, and means for retaining the elements in adjusted position.

In testimony that I claim the foregoing I have hereunto set my hand at Milwaukee in the county of Milwaukee and State of Wisconsin in the presence of two witnesses.

EDWARD J. BRANDT.

Witnesses:
N. E. OLIPHANT,
GEORGE FELBER.